United States Patent [19]

Regnault et al.

[11] Patent Number: 4,590,483

[45] Date of Patent: May 20, 1986

[54] INK JET PRINTER WITH CHARGING CONTROL OF INK-DROP FLOW VELOCITY

[75] Inventors: Luc Regnault, Bourg les Valence; Jean-Paul Maingaud, Bourg-de-Peage, both of France

[73] Assignee: Imaje S.A., Bourg les Valence, France

[21] Appl. No.: 603,127

[22] Filed: Apr. 23, 1984

[30] Foreign Application Priority Data

Apr. 29, 1983 [FR] France ............................ 83 07549
Oct. 13, 1983 [FR] France ............................ 83 16439

[51] Int. Cl.[4] ........................ G01D 9/00; G01D 15/18

[52] U.S. Cl. ........................................ 346/1.1; 346/75

[58] Field of Search ..................... 346/75, 140, 15, 1.1

[56] References Cited

U.S. PATENT DOCUMENTS

| | | | |
|---|---|---|---|
| 3,852,768 | 12/1974 | Carmichael | 346/75 |
| 3,953,860 | 4/1976 | Fujimoto | 346/75 |
| 3,977,010 | 8/1976 | Erickson | 346/75 |
| 4,007,463 | 2/1977 | Fujimoto | 346/75 |
| 4,373,164 | 2/1983 | Osaki | 346/75 |
| 4,417,256 | 11/1983 | Fillmore | 346/75 |
| 4,460,905 | 7/1984 | Thomas | 346/75 |
| 4,470,052 | 9/1984 | Lovelady | 346/75 |

FOREIGN PATENT DOCUMENTS 2210143 7/1974 France .

OTHER PUBLICATIONS

IBM Tech. Discl. Bull., vol. 19, No. 4, pp. 1203-1204.

*Primary Examiner*—E. A. Goldberg
*Assistant Examiner*—Mark Reinhart
*Attorney, Agent, or Firm*—Roland Plottel

[57] ABSTRACT

A charge detector forming part of a device for controlling the electrostatic charge applied to ink drops in an ink-jet printer comprises at least one internal conductive cylindrical rod connected to an electronic circuit and surrounded by an insulating sleeve. The sleeve is tightly fitted within an outer conductive cylinder which is connected to ground. A calibrated slot of predetermined length and width is formed so as to provide a passageway for the flow of ink drops through the detector. As each ink drop passes in front of the conductive cylindrical rod, a signal is induced and processed by the electronic circuit. The device also serves to control at least one ink-pressurizing pump with a view to ensuring constant flow velocity of the ink drops.

4 Claims, 6 Drawing Figures

Coupe AA
Coupe BB
1
2
3
10
11
12
15
16
100
M
L
e
A
B

INK JET PRINTER WITH CHARGING CONTROL OF INK-DROP FLOW VELOCITY

BACKGROUND OF THE INVENTION

1. Field of the Invention

This invention relates to an ink-drop charging-control device in an ink-jet printer as well as to the application of said device to the control of flow velocity of said ink drops.

2. Description of the Prior Art

The technique of ink-jet writing which utilizes a continuous stream of calibrated droplets delivered by a modulating system involves the need to apply an electrostatic charge to these droplets by means of a suitable electrode. The variable flow of these charged ink drops between plates brought to a high potential results in deflection of drops which is proportional to the charge and makes it possible in conjunction with the displacement of a substrate to obtain printed dot-matrix characters.

Satisfactory performance of the device calls for the introduction of means for controlling the accuracy of charging of ink drops. These means must satisfy a certain number of requirements, mainly in regard to small bulk and high ruggedness of construction. Furthermore, there must be no risk of disadjustment or impairment of the device by the chemically aggressive environment. Finally, in order to ensure efficient operation, the device must not be liable to be disturbed by any electric fields in the immediate vicinity.

SUMMARY OF THE INVENTION

The precise aim of the present invention is to provide a device which is capable of controlling the charge applied to ink drops in an ink-jet printer and which satisfies all the criteria mentioned in the foregoing. In more precise terms, the invention accordingly relates to a device which serves to control the charging of fragmented and electrostatically charged ink drops for deflection and formation of dot-matrix characters printed on a substrate. The distinctive feature of the device lies in the fact that it comprises a charge detector constituted by the combination of a hollow conductive outer cylinder connected to ground M so as to form a shield, an insulating cylinder which is inserted in the hollow outer cylinder and in intimate contact therewith, and at least one solid cylindrical rod (3) embedded in said insulating cylinder. The internal cylindrical rod (3), which is electrically isolated from the shielding, is connected to a coaxial wire which is in turn intended to be connected to an electronic circuit. A slot of width (e) and of length (L) is formed and positioned in said detector so as to be located on the path of the charged ink drops which pass through said slot without coming into contact with its walls. The charge of each ink drop which passes in front of the internal conductive cylindrical rod induces a signal which is processed by the electronic circuit.

The invention is also concerned with the application of said charging-control device to the control of flow velocity of the ink drops of an ink jet. In fact, in an ink-jet printer, a certain number of operating parameters must be maintained in spite of inevitable variations in environment. This is the case in particular with the flow velocity of ink drops. This flow velocity must be maintained constant in spite of modifications in characteristics of the ink such as viscosity which is liable to vary in the course of time. In fact, under the influence of variations in the ambient temperature or as a result of operating conditions which produce overheating, evaporation of the solvent takes place sooner or later. This results in a concomitant change in viscosity and therefore in flow velocity.

In consequence, this invention also has for its object to overcome these disadvantages and relates to a method for controlling the flow velocity of ink drops. This method essentially consists in controlling the ink pressurizing means in dependence on the time (T) taken by each ink drop to travel over a distance (D). This distance is obtained by utilizing the ink-drop charging-control device in accordance with the invention.

BRIEF DESCRIPTION OF THE DRAWINGS

Other features of the invention will be more apparent on consideration of the following description and accompanying drawings, wherein.

For the sake of enhanced clarity, the same elements are designated by the same references in all the figures.

DESCRIPTION OF THE PREFERRED EMBODIMENTS

Figures 1A, 1B, 1C:
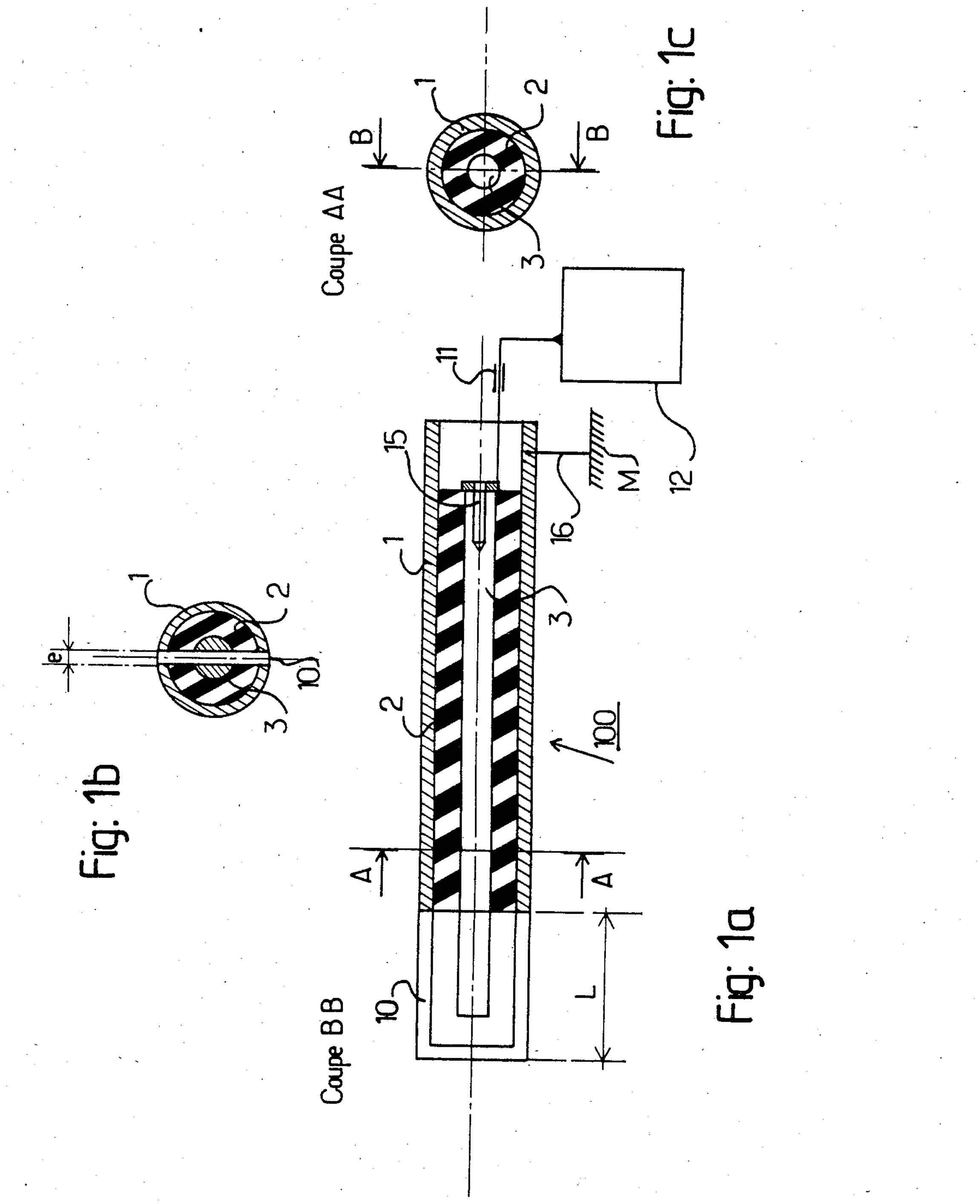
FIGS. 1*a*, 1*b*, 1*c* are schematic representations in a front view, in cross-section along line A—A and in cross-section along line B—B, and showing one example of construction of a device in accordance with the invention.

As shown in FIG. 1*a* which is completed by FIGS. 1*b* and 1*c*, a device in accordance with the invention is essentially constituted by a detector 100 presented in the form of a cylindrical assembly 1 of conductive material which may consist of stainless steel, for example, and has a diameter of a few millimeters such as 6 mm, for example. This cylindrical assembly 1 has a bore in which is introduced a second tube 2 which, in accordance with a distinctive feature of the invention, is formed of insulating material consisting, for example, of a fluorinated polymer such as PTFE. Said second tube 2 is inserted in the cylinder 1 with a view to ensuring that its external surface is in perfect contact with the internal surface of the cylinder 1 over a predetermined length which is shorter than that of said cylinder 1. In accordance with the invention, said insulating tube 2 constitutes a sleeve within which is introduced a solid cylindrical rod 3 of conductive material such as stainless steel, for example. Said rod 3 is fitted within the sleeve in such a manner as to be actually embedded in the insulating material and to ensure that the two parts are thus bonded together as intimately as possible. A slot 10 is formed in this assembly to a depth or length (L) and a width or thickness (e). Said depth (L) can be of the order of 7 to 9 mm and said thickness (e) can be of the order of 0.5 to 0.7 mm (0.6 mm, for example).

Since this device is intended to be positioned within an ink-jet printing head, it is essential to ensure that the ink drops pass through the slot 10 along its axis and obviously without coming into contact with the slot walls. To this end, it is a recommended practice to form said slot 10 when the device, also known as a charging electrode, is already permanently fixed and located in its correct position within the printing head.

In accordance with an important feature of the invention, in order to permit measurement of the charge of ink drops as they pass through the slot 10, the internal cylindrical rod 3 is connected by means of a coaxial wire 11 to an electronic charge-measuring circuit 12. Said coaxial wire 11 is connected to said cylindrical rod 3 by any known means such as a screw 15, for example. A ground lead 16 connects the outer cylinder 1 to the ground M and thus endows this latter with a shielding function.

Figures 2A, 2B:
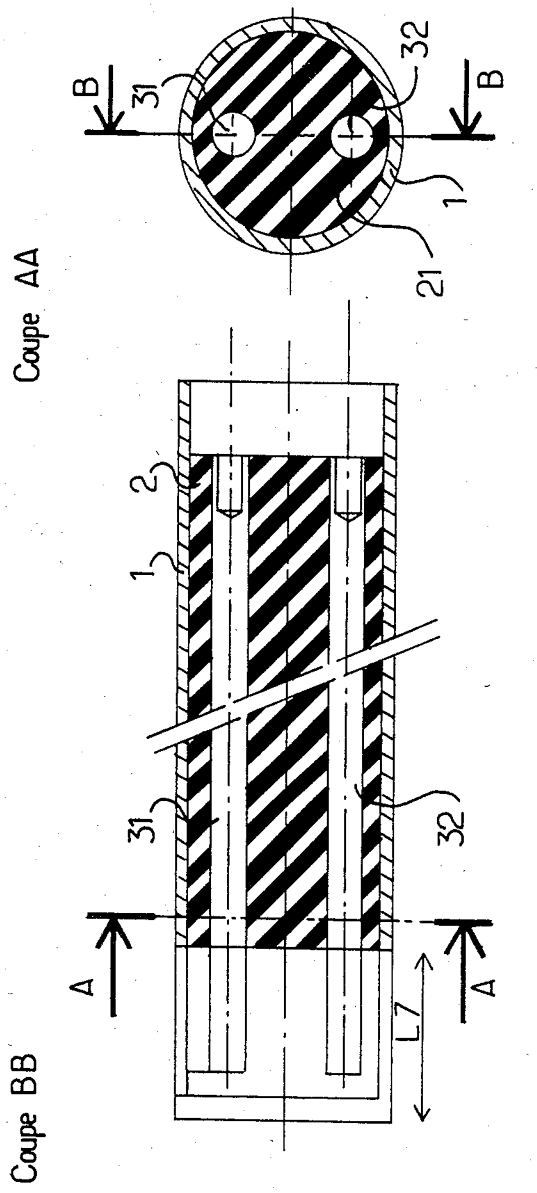
FIGS. 2*a* and 2*b* are schematic representations in a front view, in cross-section along line A—A and in cross-section along line B—B, and showing an alternative example of construction of a device in accordance with the invention.

FIGS. 2*a* and 2*b* are schematic views illustrating an alternative embodiment of a device in accordance with the invention.

In this case two charging-control electrodes are inserted in a single cylinder 1.

The interior of said outer cylinder 1 which constitutes the shielding of the device is filled over a predetermined length with insulating material $2_1$ of the same nature as the material described in the preceding alternative embodiment, namely a fluorinated polymer such as PTFE. In accordance with a distinctive feature of the invention, two holes are pierced in the insulating sleeve $2_1$. In these holes are introduced two solid cylindrical rods $3_1$ and $3_2$ which are thus embedded in the insulating sleeve 2. Finally, as in the preceding embodiment, a slot 10 is formed over a length (L) and has a width (e). The cylinders $3_1$ and $3_2$ are each connected to an electronic control circuit (not shown in FIGS. 2*a* and 2*b*). A structure of this type makes it possible to perform two successive measurements of the charge of ink drops as they pass through the slot: one measurement is taken at the level of the cylindrical rod $3_1$ and the other measurement is taken at the level of the cylindrical rod $3_2$.

Figure 3:
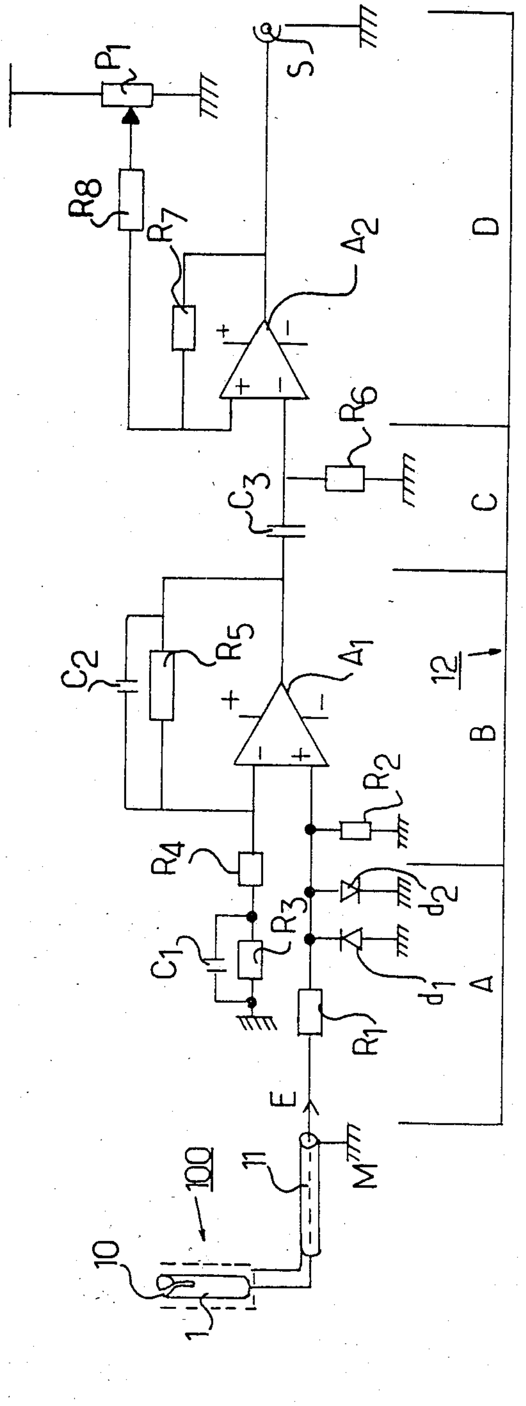
FIG. 3 is a schematic representation of an electronic circuit having the function of cooperating with a device in accordance with the invention for measuring the charge of ink drops.

One non-limitative example of construction of an electronic circuit 12 having the intended function of cooperating with a detector 100 in accordance with the invention is illustrated schematically in FIG. 3.

The detector 100 constituted by its external shielding 1 which is connected to ground M and by its slot 10 is connected to the input E of the circuit 12 by means of a coaxial tube 11. Said circuit 12 is composed of four essential portions. The first portion A which is formed by the combination of a resistor R1 and two diodes d1 and d2 of reverse polarity has the function of protecting the device against accidental overvoltages which may be caused by high voltages applied to the detector 100. The second portion B of said circuit 12 is a bandpass filter consisting of a high-gain amplifier (A1 - R5 - C2).

The positive input of said amplifier is connected to a resistor R1 which is in turn connected to ground whilst its negative input is also connected to ground M through the resistor R4 and the parallel resistor-capacitor circuit (R3 - C1).

The signal delivered by the amplifier A1 is applied to a hysteresis comparator D via a cell C formed by a capacitor C3 and a resistor R6 having the function of blocking the transmission of direct-current voltages. Said hysteresis comparator, which is constituted by an amplifier $A_2$, two resistors R7 and R8 and a potentiometer P1, delivers at the output S of the electronic circuit 12 a logical signal which can be utilized by control means of known type, said means being capable of measuring the amplitude of the signal which is present at said output S.

As already stated earlier, a charging-control electrode of this type is also capable of performing a second function, namely that of a device for controlling the flow velocity of ink drops as will be explained hereinafter.

In accordance with conventional practice, an ink-jet printer is composed of the following elements:

an ink reservoir, an ink-pressurizing pump, a piezoelectric transducer having the function of fractionating the jet, a charging electrode, a charging-control electrode, deflecting plates.

In accordance with the invention, pressurization of the ink within the printer is carried out by means of a gear-type pump of a type known per se and operated by a stepping motor. In accordance with an important feature of the invention, the performance characteristics of said pressurization means are specifically utilized for bringing the flow velocity of each ink drop to a constant value by producing a variation in pressure as a function precisely of the evolutionary change in flow velocity.

The method in accordance with the invention therefore consists in continuously measuring the flow velocity of ink drops and controlling the operation of the pressurizing pump in dependence on this variable parameter.

In a first alternative mode of execution of the method, the measurement of flow velocity consists in determining the time (T) which elapses between the moment when the first ink drop leaves the jet (this phenomenon takes place in the so-called "pinch-off" or ink-drop severance zone) and the moment when said ink drop passes into an electrode whose primary function is to control the charge of each drop, this electrode being accordingly designated as a "charging-control electrode". In point of fact, at a given level of excitation of the piezoelectric transducers whose function is precisely to fractionate or split-up the jet into droplets, the pinch-off zone is known and therefore the distance (D) between this zone and the charging-control electrode is also known. The flow velocity (V) of the ink drop is therefore deduced from the distance of travel (D) and from the ink-drop transit time (T), that is, the time taken by the ink drop to travel over this distance.

To this end, the information which gives the instant (t) of charging of an ink drop is collected at the level of the charging electrode. The information which gives the instant (t1) corresponding to detection of the charge of said ink drop is collected at the level of the charging-control electrode. The value $(t1-t)$ is then compared, thus giving the ink-drop transit time (T) and therefore the flow velocity (V). This information is advantageously collected at the level of the circuit 12.

In this first alternative mode of execution of the method in accordance with the invention, the regulating procedure involved is described hereinafter.

At the time of startup of the printer, the assembly of charging electrodes and charging-control electrodes is in the out-of-circuit condition. A set point corresponding to a speed of rotation considered as a maximum value is given to the stepping motor in accordance with a predetermined program. The pressure thus delivered is higher than the normal value, namely of the order of one and one-half times this value. The charging and charging-control electrodes are then put into circuit. In addition to their primary function, these electrodes will perform in this instance a second function of detector for detecting the instant of passage of ink drops at their level. The high value of pressure being taken into account, the point of pinch-off of the jet is located at a substantial distance from the nozzle. Said pinch-off point is located externally of the charging electrode or at all events not at the center of this latter as is the case under normal operating conditions. A few ink drops are then charged to a slight extent in order to measure the effect of application of this charging voltage. This voltage is sufficiently low to ensure that the charged ink drops are nevertheless not deflected to such an extent as to pass out of the recovery trough. The progressive variation of the charge-measurement signals is then followed on the charging-control electrode whilst the program of the machine orders this latter to produce a progressive reduction in speed of rotation of the motor and therefore in pressure.

Below a given pressure, pinch-off is detected and is located at one end of the charging electrode. The change in pressure then no longer takes place in a programmed manner. The motor carries out a few steps (of the order of 3 to 4), that is to say to just a sufficient extent to ensure that an additional reduction in pressure takes place so that the pinch-off zone is returned to the center of the charging electrode. The pressure applied at the moment at which this result is obtained produces a predetermined jet velocity which is very close in value, for example, to 20 meters per second corresponding to the time interval (T). The machine is then ready to operate.

As has already been stated, the time (T) which elapses between the moment when the ink drop leaves the jet (pinch-off zone) and the moment when its charge is measured in the charging-control electrode is continuously measured during operation of the printer. The distance between these two points is accordingly equal to (D). In consequence, when the viscosity or the characteristics of the ink vary, the supply frequency of the stepping motor or motors which control the ink-pressurizing pump or pumps is controlled so as to maintain a constant value of the time interval (T).

In this first alternative embodiment described in the foregoing, no consideration is given to the variations in position of pinch-off resulting from the influence of viscosity on the piezoelectric excitation of the transducer. However, it is clearly shown by experience that, although such an influence may indeed be disregarded in many instances, it is none the less true that it continues to exist.

Thus in the case of a constant value of piezoelectric excitation, all other parameters being equal, it is observed that there is a displacement of this pinch-off zone as a function of viscosity.

This influence of viscosity of the ink on the position of the pinch-off zone which is therefore negligible as a general rule but may prove troublesome in certain circumstances is avoided by means of a second alternative embodiment of the method in accordance with the invention as will now be explained. This embodiment entails the use of a charging-control electrode of the type described with reference to FIGS. 2*a* and 2*b*. A structure of this type permits two successive measurements of the charge of ink drops which pass through the slot, one measurement being performed at the level of the cylindrical rod 30 and the other measurement being performed at the level of the cylindrical rod 31 in accordance with the present invention. Said structure is also employed for detecting two instants of passage t and t1 of each ink drop at the level of each of the two cylindrical rods 30 and 31. In this case the distance (D) between the two electrodes is determined and established by design.

The measurement of these two charges performed for the purpose of controlling these latter can also be utilized in accordance with the invention for a second purpose. This measurement in fact permits detection of the two ink-drop transit-time intervals t and t1 and therefore a measurement of the time interval T=t1−t which has been taken by the ink drop to travel over the distance (D) between the axis of the two cylindrical rods 30 and 31, thereby making it possible to determine the velocity of each ink drop.

The time parameter (T) having thus been measured in both alternative embodiments of the method in accordance with the invention, a variation is produced in the current supply frequency of the stepping motors which control the pressurizing pumps in order to maintain the aforesaid time interval (T) at a constant value.

The method in accordance with the invention is applicable to all ink-jet printing heads in which provision is made for one charging electrode and at least one charging-control electrode as well as means for varying the ink pressure. This pressure variation is controlled by signals collected at the level of the electronic circuits which serve to initiate and control the charging of ink drops.

Under these conditions, the machine provided by the invention is fully self-contained irrespective of the age of the ink, the daily operating time and the ambient or room temperature.

There can also be associated with a device of this type an alarm system which comes into operation when the pressure passes beyond a predetermined range of values.

A charging-control device in accordance with the invention as described in the foregoing proves highly effective for the measurement of ink-drop charges which do not exceed a few picocoulombs. The device is intended to equip printing heads for ink-jet printers, whether such printers are designed in accordance with the simple form of construction or the double form of construction. As already stated earlier, the slot 10 is preferably formed when the detector has already been positioned within the printing head. Centering of the slot can thus be optimized, the result thereby achieved being to ensure enhanced reliability of the device.

The invention is applicable to all types of ink-jet printers.

What is claimed is:

1. A method for controlling the flow velocity of ink drops of an ink-jet printer comprising the steps of determining the instant t of pinch-off of ink jet drops, determining the instant t1 at which the formed ink drop passes at the level of a charging-control electrode, deducing therefrom the time interval T=t1−t, and controlling ink jet pressurizing means in accordance with the time T taken by each ink drop to travel over the distance D between the pinch-off zone in which ink drops are formed and the charging control electrode.

2. The method according to claim 1, wherein said distance D corresponds to the distance between the first and second conductive cylindrical rod, the time interval T being obtained by determining the instants of passage of one ink drop respectively at the level of said first and of said second conductive cylindrical rod.

3. The method according to claim 1, wherein said pressurizing means is formed by the combination of at least one gear pump driven by at least one stepping motor and wherein said step of controlling said pressurizing means comprises producing a variation in the frequency of the motor supply as a function of the time interval T so as to maintain said time interval T at a constant value.

4. The method according to claim 3, wherein a method is employed for establishing an initial pressurization program comprising a first stage in which the pressure is sufficiently high to ensure that the pinch-off zone is located outside the charging electrode, and wherein said method comprises progressively reducing the speed of rotation of the motor and therefore the pressure until the pinch-off zone is detected, causing the motor to carry out a number of steps which is both necessary and sufficient to produce a further reduction such that pinch-off takes place at the center of the charging electrode, measuring the time T taken by the ink drops then formed to travel over the distance D, and then maintaining said time interval T at a constant value throughout the period of operation of the printer.

* * * * *